(12) United States Patent
Marshall et al.

(10) Patent No.: US 7,937,495 B2
(45) Date of Patent: May 3, 2011

(54) SYSTEM AND METHOD FOR MODIFYING DATA TRANSFERRED FROM A SOURCE TO A DESTINATION

(75) Inventors: John W. Marshall, Cary, NC (US); Vinayak K. Parameshwara, Morrisville, NC (US); Jeffery B. Scott, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1135 days.

(21) Appl. No.: 10/603,872

(22) Filed: Jun. 25, 2003

(65) Prior Publication Data

US 2005/0010690 A1 Jan. 13, 2005

(51) Int. Cl.
*G06F 15/16* (2006.01)

(52) U.S. Cl. ......... 709/246; 370/389; 370/401; 370/469

(58) Field of Classification Search .................. 709/238; 370/469, 401, 389, 392, 395.3; 712/18
See application file for complete search history.

(56) References Cited

U.S. PATENT DOCUMENTS

| | | | |
|---|---|---|---|
| 5,930,359 A | 7/1999 | Kempke et al. | |
| 6,032,190 A * | 2/2000 | Bremer et al. | 709/238 |
| 6,122,275 A * | 9/2000 | Karol et al. | 370/389 |
| 6,195,739 B1 | 2/2001 | Wright et al. | |
| 6,205,487 B1 | 3/2001 | Cashman et al. | |
| 6,212,569 B1 | 4/2001 | Cashman et al. | |
| 6,275,508 B1 | 8/2001 | Aggarwal et al. | |
| 6,438,678 B1 | 8/2002 | Cashman et al. | |
| 6,442,669 B2 | 8/2002 | Wright et al. | |
| 6,490,280 B1 * | 12/2002 | Leung | 370/392 |
| 6,539,026 B1 | 3/2003 | Waclawsky | |
| 6,728,249 B2 * | 4/2004 | Chang | 370/395.3 |
| 6,944,168 B2 * | 9/2005 | Paatela et al. | 370/401 |
| 7,031,325 B1 * | 4/2006 | Williams | 370/401 |
| 7,100,020 B1 * | 8/2006 | Brightman et al. | 712/18 |
| 2002/0009050 A1 | 1/2002 | Ueno | |
| 2004/0042490 A1 * | 3/2004 | Henderson et al. | 370/469 |
| 2005/0232303 A1 * | 10/2005 | Deforche et al. | 370/469 |

OTHER PUBLICATIONS

"Notification of Transmittal of the International Search Report and Written Opinion of the International Searching Authority, or the Declaration" for International application No. PCT/US2004/020166, International filing date of Jun. 23, 2004.
"Written Opinion of the International Searching Authority" for International application No. PCT/US2004/020166, International filing date of Jun. 23, 2004.

* cited by examiner

*Primary Examiner* — Dustin Nguyen
(74) *Attorney, Agent, or Firm* — Cesari and McKenna, LLP (57) ABSTRACT

A technique modifies data transferred from a source to a destination on an intermediate node in a network. According to the technique, a processor of the node issues commands to modify the data. The commands are held in a data structure and not performed on the data until the data is transferred from the source to the destination. As the data is transferred the commands contained in the data structure are performed and the data is modified as directed by the commands.

29 Claims, 11 Drawing Sheets

| 810 —— | xcmi | 2,110,500 | ;insert 2 bytes into ctx loc 110 from addr 500 |
| --- | --- | --- | --- |
| 820 —— | xcmd | 2,118 | ;delete 2 bytes from ctx loc 118 |
| 830 —— | xmt | 100,64 | ;transmit packet |

FIG. 10 ved by the network. If the processor dedicates a substantial portion of its resources modifying data transferred from a source to a destination, it may not have sufficient resources left to perform these time-critical tasks.

SYSTEM AND METHOD FOR MODIFYING DATA TRANSFERRED FROM A SOURCE TO A DESTINATION

BACKGROUND OF THE INVENTION

1. Field of the Invention

The present invention relates to computer networking and in particular to modifying data transferred from a source to a destination.

2. Background Information

A computer network is a geographically distributed collection of interconnected network links and segments for transporting data between nodes, such as computers. Many types of network segments are available, with the types ranging from local area networks (LANs) to wide area networks (WANs). End nodes, such as personal computers or workstations, typically communicate over the network by exchanging discrete frames or packets of data according to predefined protocols. In this context, a protocol consists of a set of rules defining how the nodes interact with each other.

Computer networks may be further interconnected by an intermediate node, such as a switch or router, having a plurality of ports, which may be coupled to the networks. For example, a switch may be utilized to provide a "switching" function for transferring information between a plurality of LANs at high speed. The switching function includes receiving a data packet at a source port that originated from a source node and transferring that packet to at least one destination port for forwarding to a destination node.

A router may be used to interconnect LANs executing different LAN standards and/or to provide higher-level functionality than a switch. If the LAN standards associated with the source and destination nodes are dissimilar (e.g., Ethernet and token ring), the router may also alter the format of the packet so that it may be received by the destination node. Routers typically operate at the network layer of a communications protocol stack used by the network, such as the internetwork layer of the Transmission Control Protocol/Internet Protocol (TCP/IP) communications architecture.

Routers also perform various functions associated with modifying data transferred from a source to a destination, such as processing packets received by the router. These functions may include inserting, deleting, or replacing information in a packet. For example, some routers support the Multi-Protocol Label Switching (MPLS) protocol. The MPLS protocol provides a method of assigning labels that instructs routers where to send a packet and the priority that packet should receive. In accordance with MPLS, packets are transmitted on a label-switched path (LSP). An LSP is a simplex path that typically comprises a sequence of labels that represent every node along the path from a source label-edge router (LER) to a destination LER. An LER is a device (e.g., router) that operates at the edge of the access network and MPLS network, and is typically involved in the assignment and removal of LSPs, as traffic enters or exits an MPLS network. In a typical arrangement, an LSP is generated by concatenating the labels to form the path. The LSP is then inserted into the packet's header at the source LER. When the packet reaches the destination LER, the labels are deleted (removed) from the packet's header and the packet is further processed, e.g., the packet may be forwarded.

An LER often employs a processor (CPU) to insert and delete the LSPs contained in the packets carried over an MPLS network. Usually, the processor also performs other tasks for the LER, such as implementing various routing protocols and generally managing the LER. However, employing the processor to insert and delete LSPs in packets may not be an efficient use of the processor's resources. Inserting and deleting LSPs often consumes time and memory resources, and may waste valuable processor resources that could be better employed performing other tasks, such as executing routing protocols.

For example, generating and inserting an LSP into a packet often involves (i) generating the LSP by moving various pieces of data from various memory locations into a single memory area and (ii) inserting the LSP into the packet's header, which may further involve breaking the packet header into leading and lagging portions prior to inserting the LSP between the portions. Clearly this process involves a great deal of computing resources and memory bandwidth. Depending upon the amount of traffic processed, an inordinate amount of processor resources may be dedicated to modifying the data traffic, e.g., processing LSPs, which may impact the processor's ability to perform other tasks, such as processing other packets, managing routing tables, and responding to other routers in the network. This in turn may result in decreased packet processing performance (i.e., packet throughput) of the router. Moreover, in some cases these tasks may be time-critical, requiring the processor to complete the task within a certain time window. An example of such a task is the sending of a "keep-alive" packet within a certain time frame in order for the router to be acknowledged by the network. If the processor dedicates a substantial portion of its resources modifying data transferred from a source to a destination, it may not have sufficient resources left to perform these time-critical tasks.

SUMMARY OF THE INVENTION

The present invention relates to an efficient technique for modifying data transferred from a source to a destination of an intermediate node in a computer network. According to the technique, commands are generated at the intermediate node wherein each command is associated with an operation that modifies the data. Each command is placed in a data structure where it is held and the operation associated with the command is not performed until the data is transferred by the node from the source to the destination. As the data is transferred, the operations associated with the commands are performed and the data is modified as directed by the commands.

In the illustrated embodiment, the source is a context memory, the destination is an output buffer, the data structure is a command table comprising one or more entries, and the data is a packet header contained in the context memory (i.e., context data). A processor executes instructions to perform operations that modify the context data, such as insert data into and delete data from the context data. The instructions generate commands that are associated with the operations; these commands are then placed into entries contained in the command table. Upon completing processing of the context data, the processor executes a transmit command and directs a data mover to transfer the context data from the context memory to the output buffer. As the context data is transferred the data mover examines the entries in the command table and modifies that data as directed by the commands contained in the entries.

Advantageously, the inventive technique is an improvement over prior techniques in that it enables data transferred from a source to a destination to be modified without requiring a substantial usage of processor resources. Rather, in accordance with the inventive technique, the processor merely issues commands to an assist (the data mover) to modify the data. The commands are then performed without utilizing processor resources when the data is transferred from the source to the destination.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
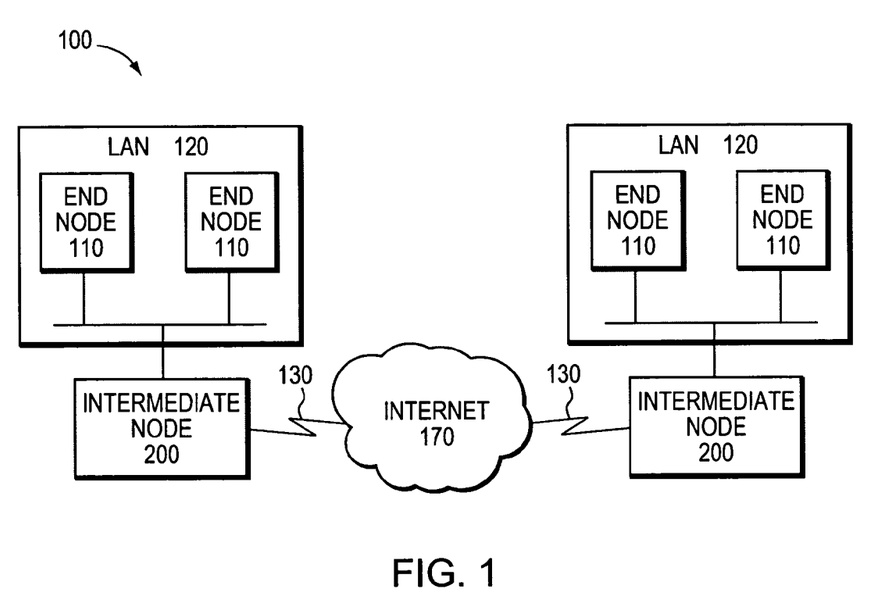
FIG. 1 is a schematic block diagram of a data network that may be advantageously used with the present invention.

FIG. 1 is a schematic block diagram of a computer network 100 that may be advantageously used with the present invention. The computer network 100 comprises a collection of communication links and segments connected to a plurality of nodes, such as end nodes 110 and intermediate nodes 200. The network links and segments may comprise local area networks (LANs) 120, wide area networks (WANs), such as Internet 170 and WAN links 130 interconnected by intermediate nodes 200 to form an internet-work of computer nodes. These internetworked nodes communicate by exchanging data packets according to a predefined set of protocols, such as the Transmission Control Protocol/Internet Protocol (TCP/IP) and the Internetwork Packet eXchange (IPX) protocol.

Figure 2:
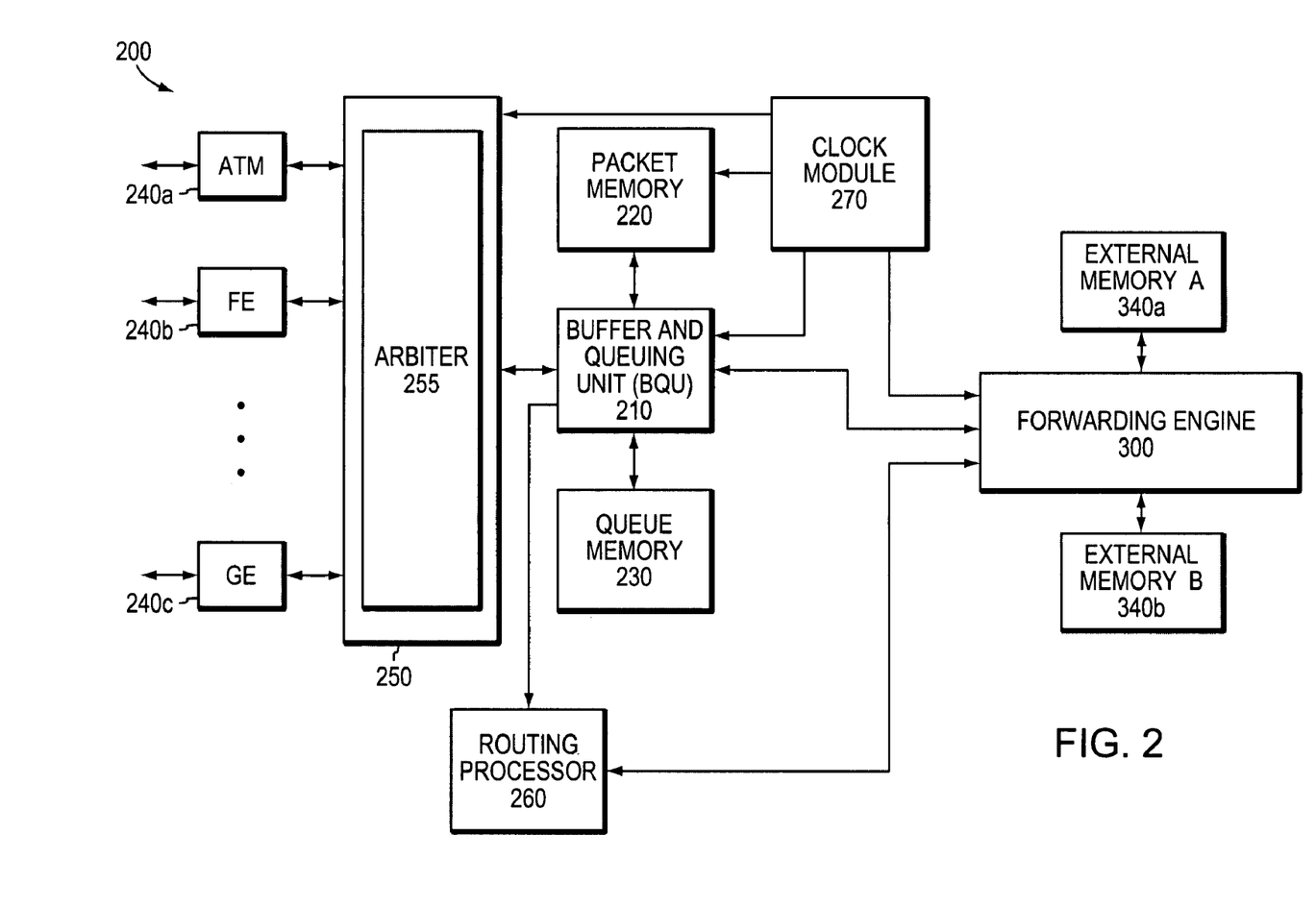
FIG. 2 is a high-level schematic block diagram of an intermediate node that may be advantageously used with the present invention.

FIG. 2 is a high-level schematic block diagram of intermediate node 200, which illustratively is a router. An example of a router that may be advantageously used with the present invention is the Cisco 10000 Series Internet Router available from Cisco Systems Incorporated, San Jose, Calif. Node 200 comprises a plurality of interconnected components including a forwarding engine 300, various memories, queuing logic 210, and network interface cards (line cards) 240. Operations of these components are preferably synchronously controlled by a clock module 270 although the arrayed elements of the forwarding engine 300 may be operatively configured to function asynchronously. In the illustrative embodiment, the clock module 270 generates clock signals at a frequency of, e.g., 200 megahertz (i.e., 5 nanosecond clock cycles), and globally distributes them via clock lines to the components of the intermediate node.

The memories generally comprise random-access-memory (RAM) storage locations addressable by the forwarding engine 300 and logic for storing data structures accessed by the components and software programs including programs that implement aspects of the present invention. An operating system, portions of which are typically resident in memory and executed by the forwarding engine 300, functionally organizes node 200 by, inter alia, invoking network operations in support of software processes executing on node 200. It will be apparent to those skilled in the art that other memory means, including various computer readable media, may be used for storing and executing program instructions pertaining to the inventive technique and mechanism described herein.

The buffer and queuing unit (BQU) 210 is connected to a packet memory 220 for storing packets and a queue memory 230 for storing network and link layer headers of the packets on data structures, such as linked lists, organized as queues (not shown). The BQU 210 further comprises interface circuitry for interconnecting the forwarding engine 300 with a plurality of line cards 240 via a selector circuit 250 having an arbiter 255. The line cards 240 may comprise, e.g., Asynchronous Transfer Mode (ATM), Fast Ethernet (FE) and Gigabit Ethernet (GE) ports, each of which includes conventional interface circuitry that may incorporate the signal, electrical and mechanical characteristics, and interchange circuits, needed to interface with the physical media and protocols running over that media.

A routing processor 260 executes conventional routing protocols for communication directly with the forwarding engine 300. The routing protocols generally comprise topological information exchanges between intermediate nodes to determine preferred paths through the network based on, e.g., destination IP addresses. These protocols provide information used by the processor 260 to create and maintain forwarding tables. The tables are loaded into the external memories 340 as forwarding information base (FIB) tables, used by the engine 300 to perform, e.g., layer-2 (L2) and layer-3 (L3) forwarding operations. When processing a header in accordance with IP routing, for example, engine 300 determines where to send the packet by indexing into the FIB using an IP address of the header. Execution of the forwarding operations results in destination media access control (MAC) addresses of the headers being rewritten by the forwarding engine 300 to identify output ports for the packets.

Figure 3:
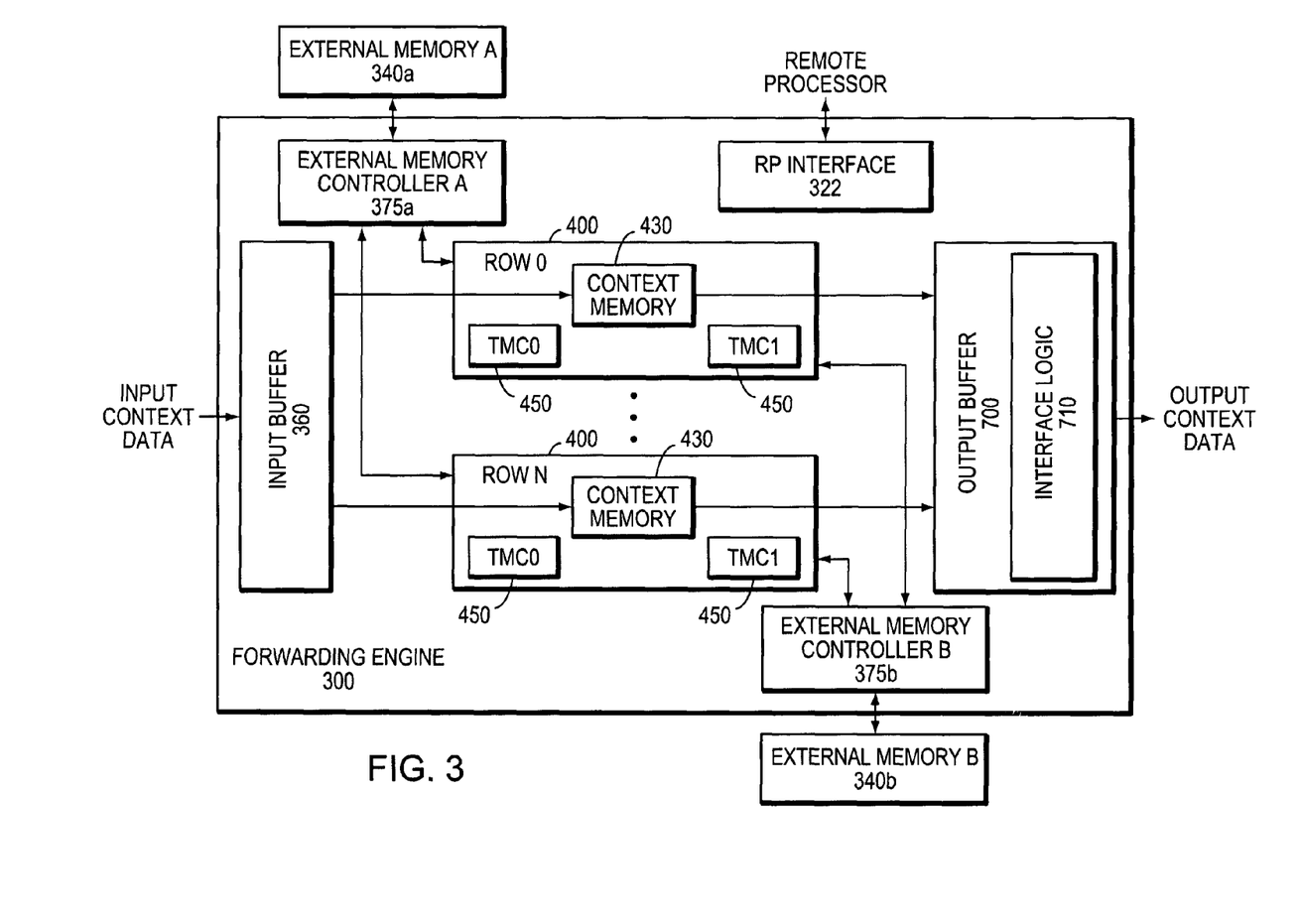
FIG. 3 is a schematic block diagram of a forwarding engine organized as a systolic array of processors that may be advantageously used with the present invention.

The forwarding engine 300 may comprise a symmetric multiprocessor system having a plurality of processing elements or processors. FIG. 3 is a partial schematic block diagram of forwarding engine 300 comprising a plurality of processors (TMCs) 450 organized as a multi-dimensional systolic array. Each processor 450 is preferably a pipelined processor that includes, inter alia, a plurality of arithmetic logic units (ALUs) and a register file having a plurality of general purpose registers that store intermediate result information processed by the ALUs. The processors 450 may be arrayed into multiple rows and columns. In the illustrative embodiment, the processors are arrayed as eight (8) rows and two (2) columns in an 8×2 arrayed configuration that is embedded between an input buffer 360 and an output buffer 700. However, it should be noted that other arrangements, such as 4×4, or 8×2, or 8×1 arrayed configurations, might be advantageously used with the present invention. As noted herein, a single processor supporting multiple threads of execution can take advantage of the invention.

The forwarding engine 300 is coupled to a plurality of external memory resources 340 via memory controllers 375. The external memory 340 is preferably organized as one or more banks and implemented using fast-cycle-random-access-memory (FCRAM) devices, although other devices, such as reduced-latency-dynamic-random-access-memory (RLDRAM) devices or static-random-access-memory (SRAM) devices, could be used. The external memory 340 is an external "column" memory configured to store non-transient data (e.g., forwarding tables, queues) organized as a series of data structures for use in processing transient data (e.g., packets). Each memory controller 375 contains logic that enables access to memory locations contained in the associated external memory 340. As used herein, a memory subsystem comprises an external memory 340 and its associated memory controller 375. The processors 450 of a column are coupled to a particular external memory subsystem. For example, the processors of column one (i.e., TMC1 in rows zero through N) are coupled to an external memory subsystem comprising external memory controller B 375b and external memory B 340b.

Figure 4:
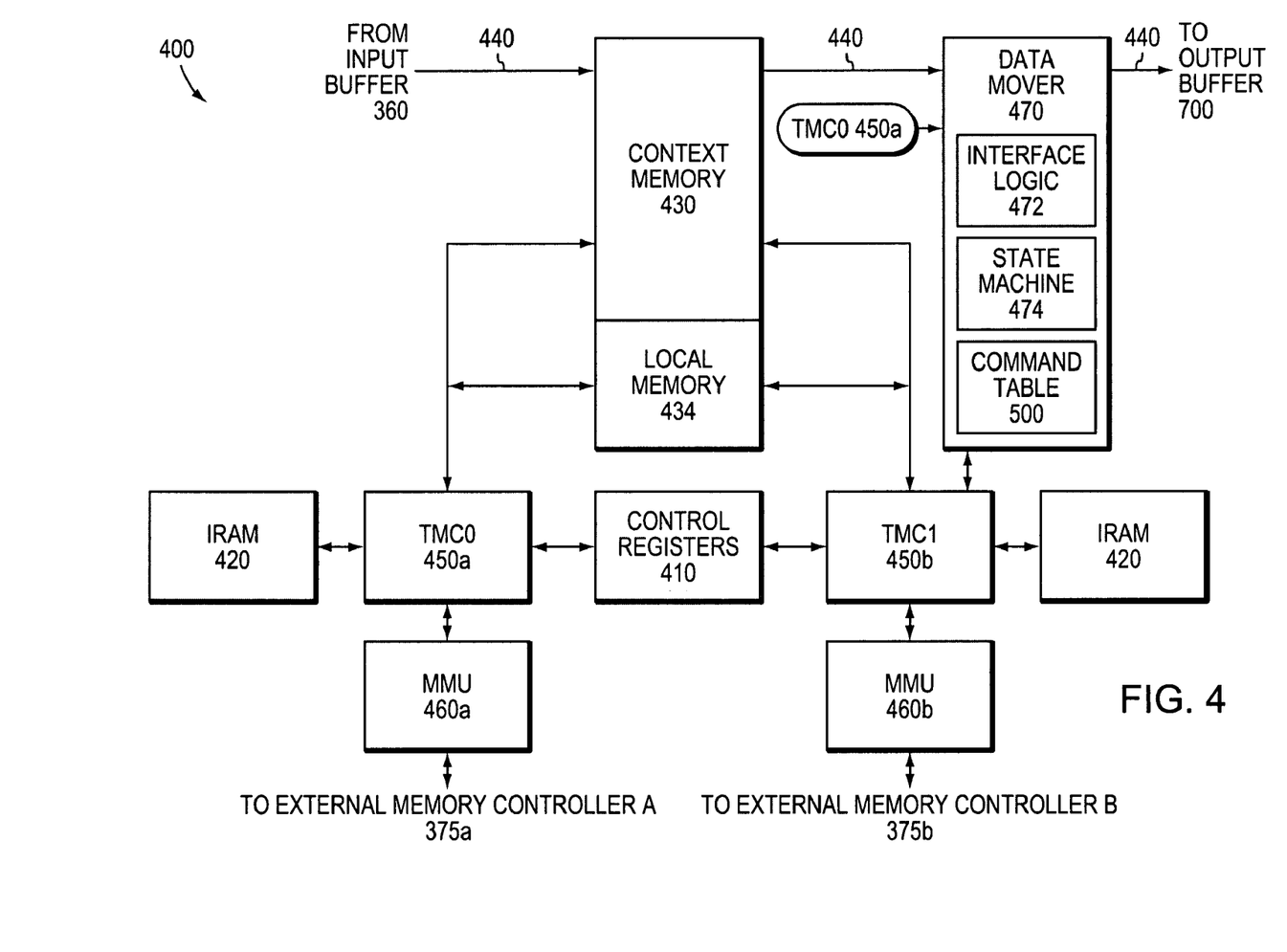
FIG. 4 is a schematic block diagram of a processor cluster that may be advantageously used with the present invention.

The processors 450 of a row are organized as a cluster 400 containing a context memory 430 configured to hold context information (e.g., packet headers) processed by the processors 450. FIG. 4 is a schematic block diagram of a cluster 400. Each processor 450 of the cluster is coupled to an instruction memory (IRAM) 420, configured to store instructions for execution by the processor 450, a control registers unit 410, the context memory 430 and a memory management unit (MMU) 460. The control registers unit 410 comprises various general-purpose and control registers used for storage and used to control the operation of the TMCs 450, respectively. The MMU 460 is configured to, inter alia, enable the processors 450 to access the external memory 340 through the external memory controller 375.

Context memory 430 is a RAM configured to hold transient (context) data, such as packet headers. Local memory 434 is an internal RAM configured to hold various data accessed accessible to the processors 450 in a cluster 400. It should be noted that other forms of memory, such as an internal or an external column memory (e.g., memory 340) accessible to processors 450 of a particular column may be used with the present invention.

The processors 450 of each cluster 400 execute operations on the transient data loaded into the context memory 430 by the input buffer 360, whereas the processors of each column operate in parallel to perform substantially the same operation on the transient data, but with a shifted phase. Transient data are passed between the input and output buffers of the engine 300 over a data path channel 440 provided by a data mover circuit 470 coupled to the processor 450. The context data flowing through the cluster 400 are stored in the context memory 430 along with other data and pointers that reference data and various data structures (e.g., tables) stored in, e.g., external memory 340, for use by the processor 450.

The data mover 470 comprises logic that enables data to be transferred from the context memory 430 to the output buffer 700 in accordance with the inventive technique. To that end, the data mover 470 comprises, inter alia, logic that implements a command table 500, a state machine 474 and interface logic 472. The interface logic 472 comprises logic that interfaces the data mover 470 to the output buffer 700 and enables, illustratively, a 16-byte data unit and an associated 2-byte bit mask to be transferred between the data mover 470 and the output buffer 700. The state machine 474 contains combinatorial and sequential logic configured to implement a conventional state machine that, inter alia, enables data to be transferred from the context memory 430 to the output buffer 700.

In the illustrated embodiment, data transferred from the context memory 430 to the output buffer 700 are modified by commands generated by the processors 450. These commands contain operations, such as an insert data and delete data operations, that enable data to be inserted into and deleted from the transferred data, respectively. Commands generated by the processors 450 are held in a command table 500, which is a data structure illustratively configured as a table containing one or more entries. It should be noted that other types of data structures may be used to implement command table 500, such as an array, a linked list, a variable, a register, or a register file. Each entry holds a command associated with an operation (e.g., an insert data operation or a delete data operation) that is performed on the data transferred from the context memory 430 to the output buffer 370.

Figure 5:
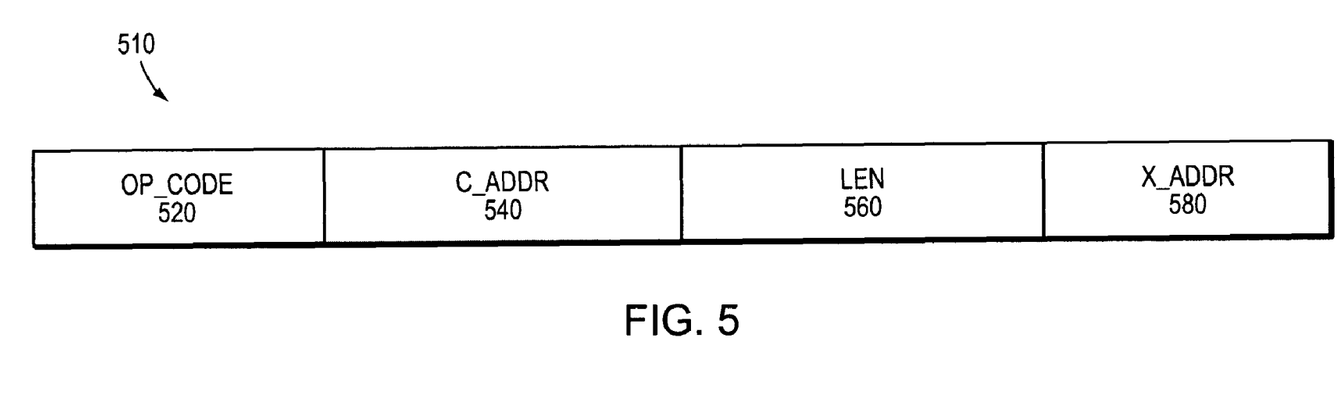
FIG. 5 is a schematic block diagram of a command table entry that may be advantageously used with the present invention.

FIG. 5 is a schematic block diagram of a command table entry 510 that may be advantageously used with the present invention. Entry 510 contains an operation code (OP_CODE) field 520, a context-memory (source) address (C_ADDR) field 540, a length (LEN) field 560, and an external address (X_ADDR) field 580. The OP_CODE field 520 holds a value associated with the operation (e.g., insert data, delete data) performed on the data being transferred. Each operation is further associated with a starting address, a length, and optionally an external address. The C_ADDR field 540 holds an address that represents the starting address of the data in context memory where the operation 520 is performed. The LEN field 560 holds a value that represents, e.g., the amount of data bytes operated on by the operation code 520. The X_ADDR field 580 holds an address associated with external data that is, e.g., inserted into the transferred data.

As noted, data is transferred between the data mover 470 and the output buffer 700 illustratively 16 bytes at a time. Accompanying the data is a 2-byte bit mask that is associated with the 16 bytes of data and indicates which bytes, within the data, are "valid" (enabled) and "invalid" (not enabled). As used herein, a byte is "valid" if it contains a valid data value and "invalid" if it does not contain a valid data value (i.e., a data value that is "undefined"). It should be noted that although in the illustrated embodiment the bit mask represents valid and invalid bytes in the data, bit masks that represent, e.g., valid or invalid bits or words in the transferred data, may also take advantage of the inventive technique.

Figure 6:
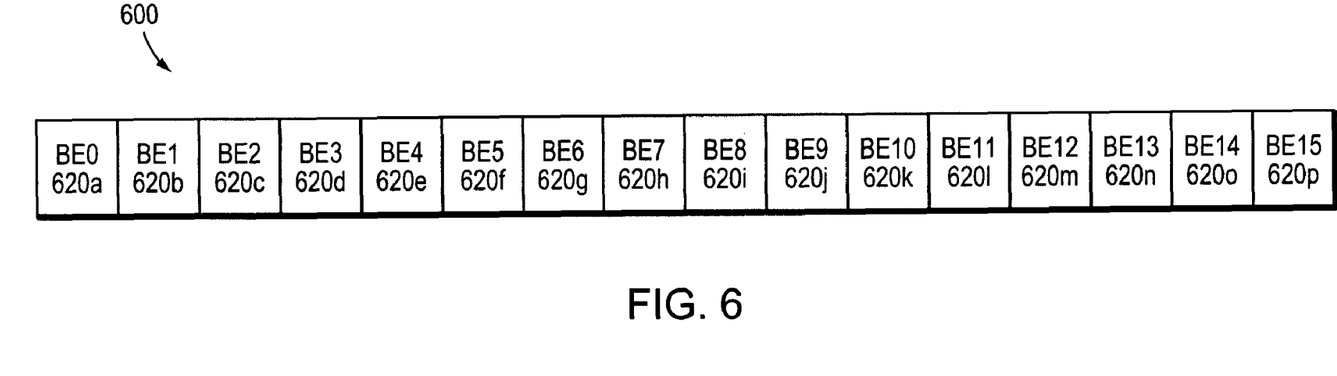
FIG. 6 is a schematic block diagram of a bit mask that may be advantageously used with the present invention.

FIG. 6 is a schematic block diagram of a bit mask 600 that may be advantageously used with the present invention. Illustratively, bit mask 600 comprises 16 one-bit "byte enable" (BE) fields 620a-p wherein each field is associated with a byte in the data unit and contains a value that indicates whether the associated data byte is valid or invalid. For example, BE0 620a corresponds to the byte in position zero (byte 0) in the data unit and indicates whether byte 0 contains a valid or invalid byte value. Illustratively, configuring the field 620 to contain a zero indicates the corresponding byte is invalid. Likewise, configuring the field 620 to contain a one indicates the corresponding byte is valid.

Figure 7:
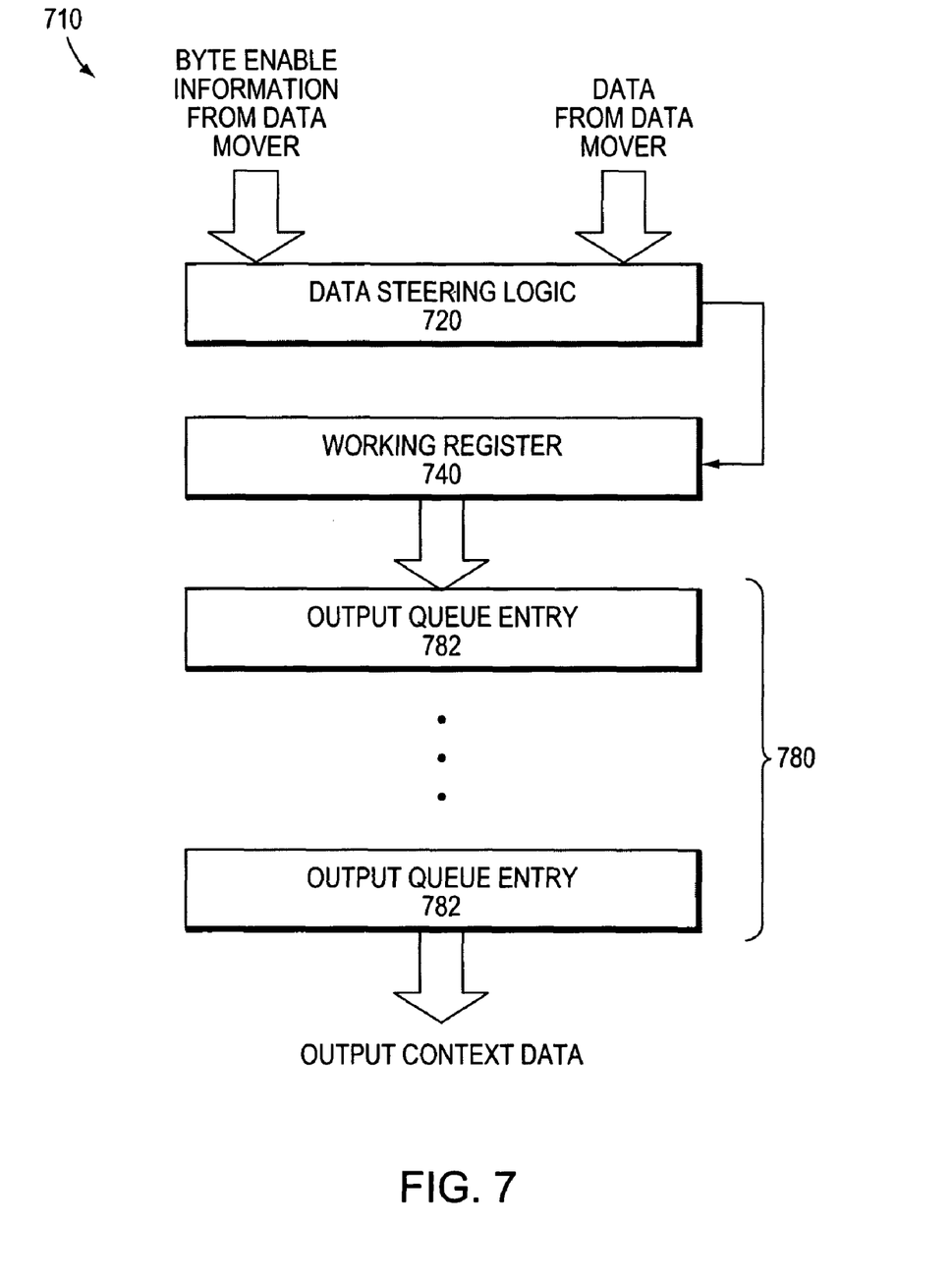
FIG. 7 is a partial schematic block diagram of output buffer logic that may be advantageously used with the present invention.

Output buffer 700 contains interface logic 710 that is configured to acquire data and byte enable information transferred from the data mover 470. FIG. 7 is a partial schematic block diagram of interface logic 710 comprising data steering logic 720, a working register 740, and an output queue 780. The data steering logic 720 contains logic configured to "steer" (transfer) valid data bytes acquired from the data mover 470 to working register 740, which illustratively is a shift register. Output queue 780 is illustratively a first-in-firstout (FIFO) queue comprising one or more entries 782 each of which holds valid data transferred from the working register 740. Data and byte enable information acquired from the data mover's interface logic 472 are transferred to the data steering logic 720 which steers valid data bytes contained in the data into the working register 740 by shifting the valid bytes into the register 740. The data steering logic then directs the working register to transfer the valid data to an entry 782 at the tail of output FIFO queue 780.

The present invention relates to an efficient technique for modifying data transferred from a source (e.g., context memory 430) to a destination (e.g., output buffer 700) of an intermediate node, such as router 200. According to the technique, commands containing operations that modify the data are generated by e.g., processor 450, and placed in a data structure (e.g., command table 500). The operations associated with the commands modify the data as directed by the commands as the data is transferred from the source to the destination.

Figure 8:
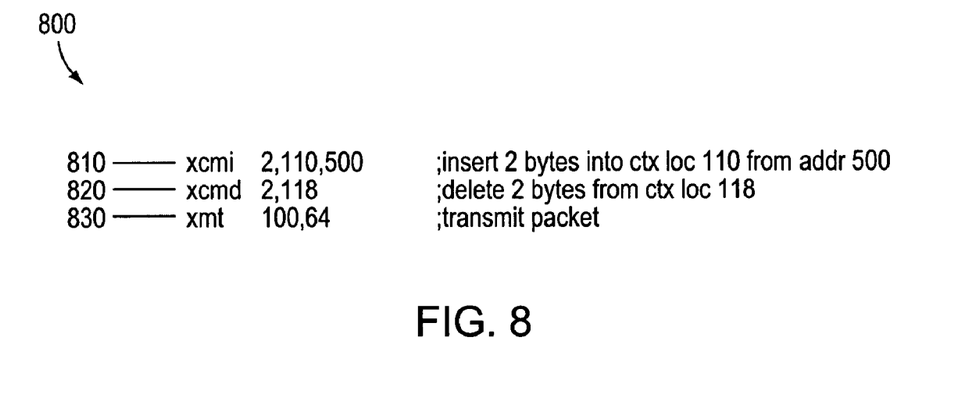
FIG. 8 is a listing of exemplary instructions that may be advantageously used with the present invention.

In the illustrated embodiment, a processor 450 modifies (e.g., inserts data into or deletes data from) data transferred from the context memory 430 to the output buffer 700 by executing instructions to generate commands that specify the modification that is performed. FIG. 8 illustrates a series of exemplary instructions 800 that may be used to insert data into and delete data from the transferred data. Instruction 810 is a context-memory insert data instruction (xcmi) that causes "insert data" to be inserted into the data transferred from the context memory 430 to the output buffer 700. Instruction 810 specifies an operation (i.e., xcmi) that indicates "insert data," and various arguments/parameters, including an amount of data to insert (i.e., 2 bytes), a context-memory address where the data are inserted (i.e., 110), and an address of the insert data (i.e., 500). Note that, the address of the insert data may be an address in, e.g., the context memory 430, the local memory 434, or external memory 340. Instruction 820 is a context-memory delete instruction (xcmd) that causes data to be deleted from the data transferred from the context memory 430 to the output buffer 700. Instruction 820 specifies an operation (i.e., xcmd) that indicates "delete data," an amount of data deleted (i.e., 2 bytes), and a context-memory address where the data are deleted (i.e., 118). Instruction 830 is a context-memory transmit instruction (xmt) that causes data to be transferred from the context memory 430 to the output buffer 700. Instruction 830 specifies an operation (i.e., xmt) that indicates transmit data, a starting context-memory address (i.e., 100), and amount of data transferred in, e.g., bytes (i.e., 64).

Figure 9A:
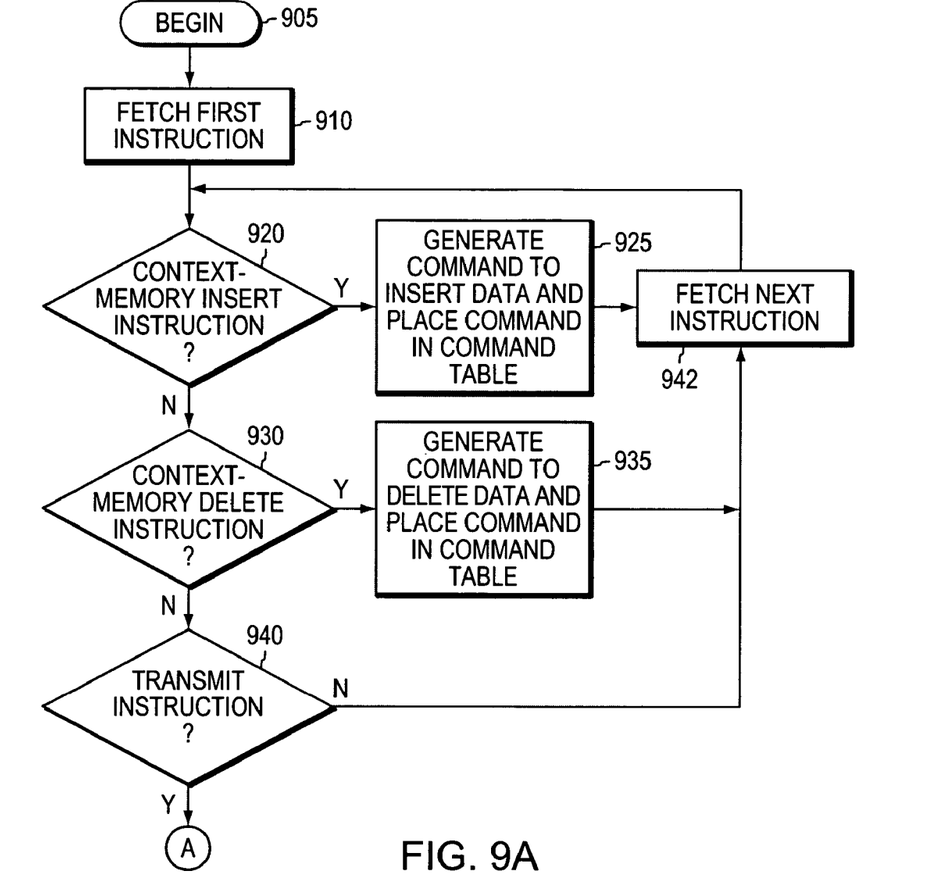
FIGS. 9A-9C are flow diagrams of a sequence of steps that may be advantageously used to implement the present invention.
Figure 9B:
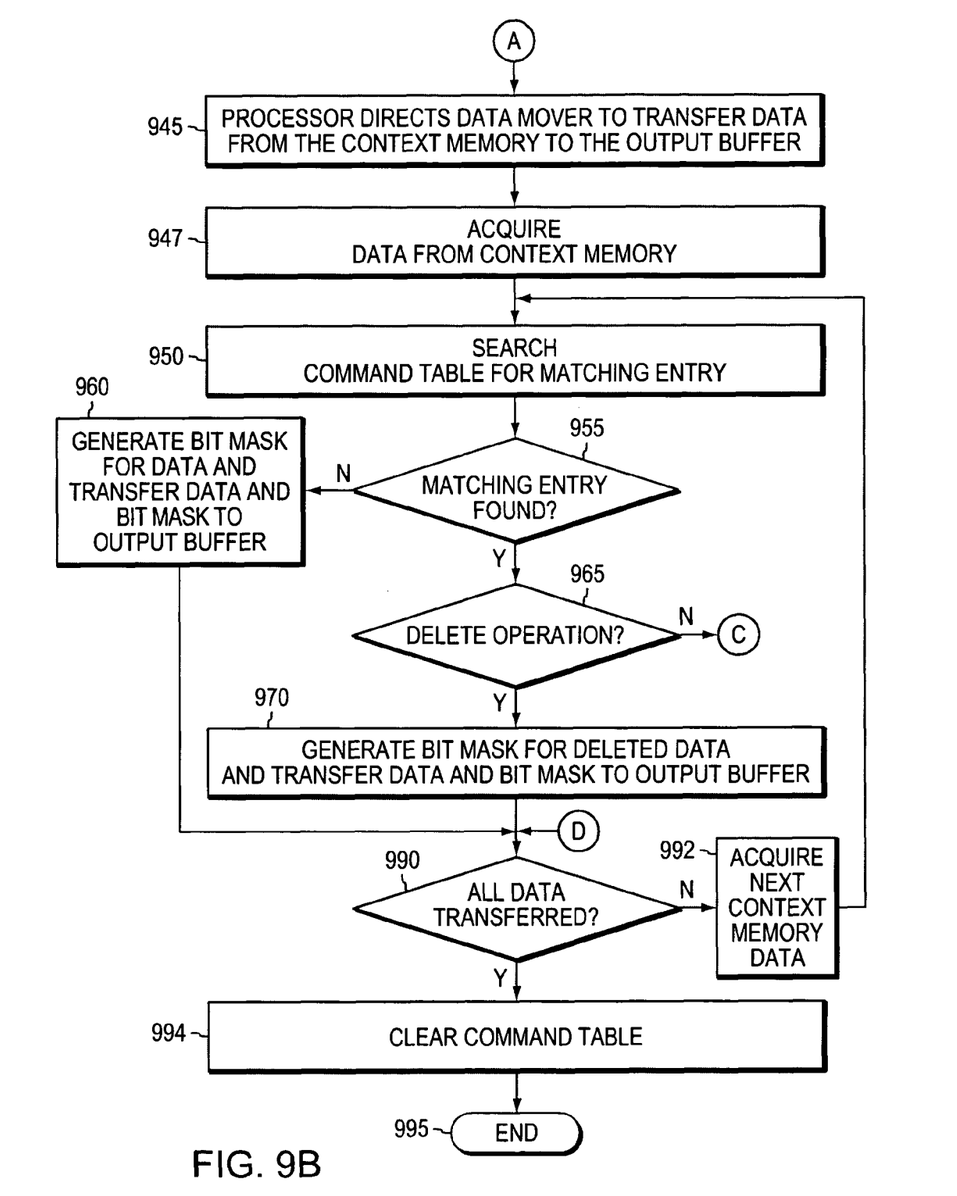
Figure 9C:
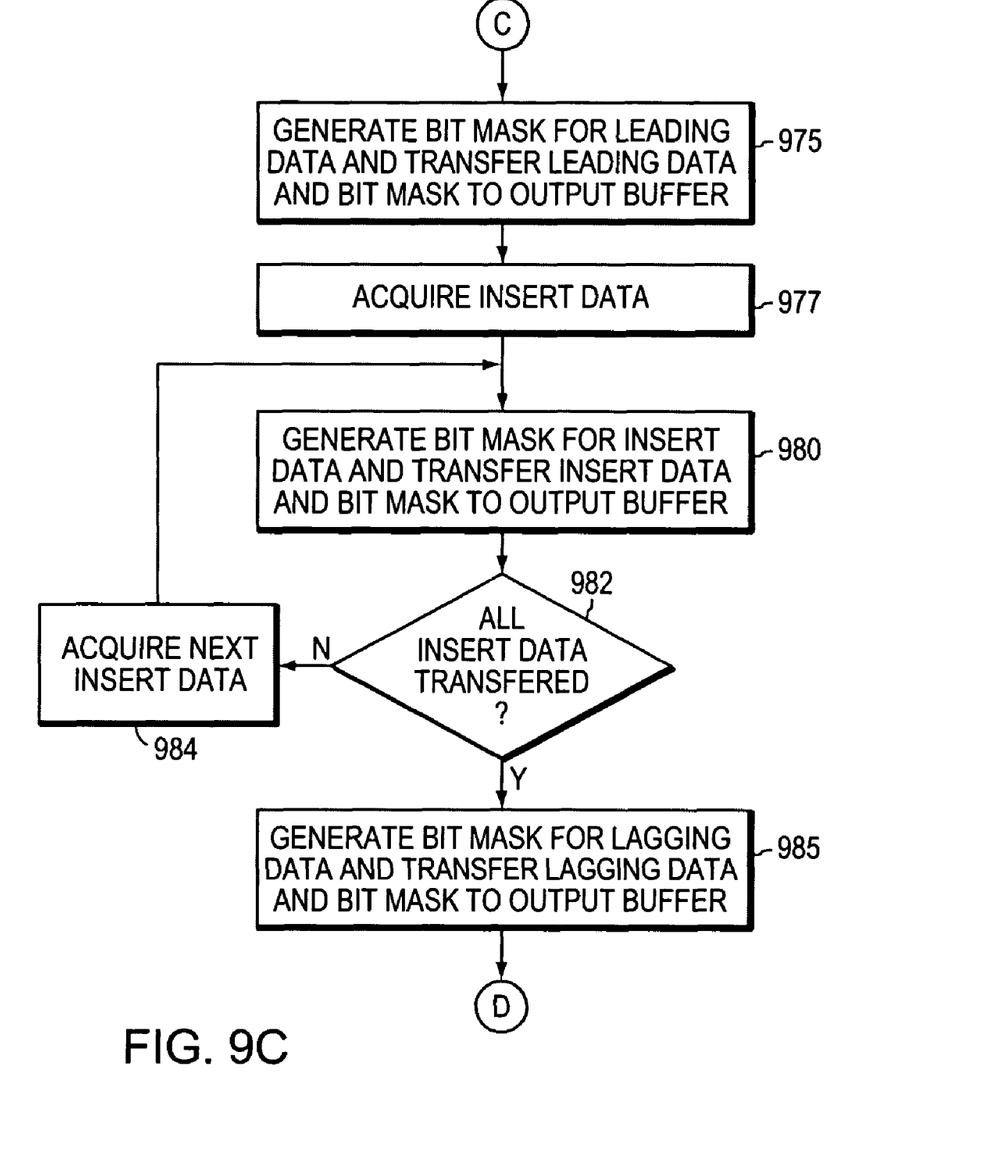

FIGS. 9A-9C are flowcharts illustrating a series of steps that may be used to process instructions 800 in accordance with the inventive technique. Referring also to FIG. 8, at Step 910, processor 450 fetches a first instruction 810 and determines if the instruction is a context-memory insert instruction (Step 920). If not, the sequence proceeds to Step 930. Since, as noted above, the instruction is a content-memory insert instruction, the sequence proceeds to Step 925 where the processor 450 generates a command to insert data into the packet as specified by instruction 810 and places the command in a command table entry 510. Specifically, processor 450 generates the command by generating values that represent the operation code, context-memory address, length, and the address of the insert data, specified in the instruction 810. The processor 450 then places these values in the OP_CODE 520, C_ADDR 540, LEN 560, and X_ADDR 580 fields, respectively, of the entry 510 in command table 500.

The sequence then proceeds to Step 942 where the next instruction is fetched prior to returning to Step 920. Assume instruction 820 is the next instruction. At Step 920, a check is performed to determine if instruction 820 is a context-memory insert instruction. Since instruction 820 is not a context-memory insert instruction, the sequence proceeds to Step 930 where a check is performed to determine if instruction 820 is a context-memory delete instruction.

Since, as noted above, instruction 820 is a context-memory delete instruction, the sequence proceeds to Step 935 where processor 450 generates a command to delete data from the packet as specified by instruction 820 and places the command in a command table entry 510. Specifically, processor 450 generates the command by generating values that represent the operation code, context-memory address, and length specified in the instruction 820. Processor 450 then places these values in the OP_CODE 520, C_ADDR 540, and LEN 560 fields, respectively, of the entry 510 in the command table 500.

The sequence then proceeds to Step 942 where the next instruction is fetched prior to returning, again, to Step 920. Assume instruction 830 is the next instruction. At Step 920 as noted above, a check is performed to determine if instruction 830 is a context-memory insert instruction. Since instruction 830 is not a context-memory insert instruction, the sequence proceeds to Step 930 where instruction 830 is checked to determine if it is a context-memory delete instruction. Since instruction 830 is not a context-memory delete instruction, the sequence proceeds to Step 940 where a check is performed to determine if instruction 830 is a context-memory transmit instruction. Since as indicated above, instruction 830 is a context-memory transmit instruction, the sequence proceeds to Step 945 (FIG. 9B) where the processor 450 directs the data mover 470 to transfer data from the context memory 430 to the output buffer 700. Specifically, the processor 450 directs data mover 470 to transfer 64 bytes of data from the context memory 470 starting at context-memory location 100 to the output buffer 700. At Step 947, the data mover 470 acquires 16 bytes of data from the context memory starting at address 100.

At Step 950, the data mover 470 searches the command table 500 for an entry 510 in the command table that matches the range of addresses associated with the acquired data. An entry 510 matches the range of addresses associated with the acquired data if the range of addresses specified by the combination of the contents of the C_ADDR field 540 and the LEN field 560 overlaps the range of addresses associated with the acquired data. For example, the range of addresses associated with the acquired data includes context-memory addresses in the range of 100 to 115. The address range specified by instruction 810 overlaps this range; thus, the entry 510 that is associated with instruction 810 is a matching entry. At Step 955, if a matching entry is not found, the data mover 470 assumes that the acquired data is not modified and the sequence proceeds to Step 960 where a bit mask is generated for the acquired data, as described above, and the bit mask and data is transferred to the output buffer. Otherwise, if a matching entry is found the sequence proceeds to Step 965. Assume a matching entry 510 associated with instruction 810 is found.

At Step 965, the content of the matching entry's OP_CODE field 520 is examined to determine if it represents a "delete data" operation. If so, the sequence proceeds to Step 970; otherwise, the sequence proceeds to Step 975 (FIG. 9C). As indicated above, the content of the OP_CODE field 520 in the matching entry 510 indicates an insert data operation; thus, the sequence proceeds to Step 975.

At Step 975, the data mover 470 generates a bit mask 600 for the "leading data" in the acquired context-memory data and transfers the acquired data and bit mask 600 to the output buffer 700. As used herein, leading data refers to the data in the acquired context-memory data that precedes the data that is inserted. For example, as noted above, the addresses represented by the acquired context-memory data ranges from 100 through 115 and the C_ADDR value of the matching entry is 110. Thus, the leading data comprises the valid data bytes acquired from context-memory address locations 100 through 109. The data mover 470 generates the bit mask for the leading data by marking the bits in mask 600 that represent byte locations 100 through 109 (i.e., BE0 620a through BE9 620j) to indicate the data are valid and marking the remaining bits in mask 600 (i.e., BE10 620k through BE15 620p) to indicate the remaining data are invalid (as it relates to being leading data). The data mover 470 then transfers the acquired data along with the bit mask 600 to the output buffer logic 700, which processes the data and bit mask, as described above.

At Step 977, the data mover 470 acquires "insert data," i.e., data that is inserted into the stream of data transferred from the context memory 430 to the output buffer 700. At Step 980 the data mover 470 generates a bit mask 600 for the acquired insert data, and transfers the acquired insert data and bit mask 600 to the output buffer 700. Specifically, the data mover 470 fetches the contents of the LEN field 560 and the X_ADDR field 580 of the matching entry 510. The data mover then acquires e.g., 16 bytes, or the number of bytes represented by the content of the LEN field 560, whichever is less, of insert data starting at the address specified in the matching entry's X_ADDR field 580. The data mover 470 then generates a bit mask 600 for the acquired insert data, as described above. The insert data and bit mask 600 are then transferred to the output buffer 700, where they are further processed.

For example, in the matching entry 510 associated with instruction 810, the LEN field 560 contains a value that indicates two bytes of insert data. The data mover 470 fetches the two bytes of insert data from the location specified by the X_ADDR field 580 (i.e., 500). The bit mask 600 is then generated by marking the byte-enable bits corresponding to, e.g., bytes 0 and 1, (BE0 620a and BE1 620b), to indicate they are valid and the remaining bits, i.e., BE2 620c through BE15 620p, to indicate they are invalid. The insert data is then placed in byte positions 0 and 1 of a 16-byte data unit transferred along with the generated bit mask 600 to output buffer 700.

At Step 982, the data mover 470 determines if all the insert data, specified by the matching entry's LEN field 560, has been transferred. If not, the sequence proceeds to Step 984 where the next insert data is acquired. Steps 980 through 984 are repeated until all the insert data represented by the combination of the contents of the matching entry's X_ADDR 580 and LEN 560 fields have been transferred to the output buffer 700.

The sequence then proceeds to Step 985 where the data mover 470 generates a bit mask 600 representing the lagging data, in a manner as described above, and transfers the acquired context-memory data and generated bit mask 600 to the output buffer 700. As used herein, the lagging data is the valid data in the acquired context-memory data that was not transferred as leading data at Step 975. For example, as noted above, the leading data comprises bytes 0 through 9 in the acquired context-memory data. The remaining is valid data, i.e., bytes 10 through 15 in the acquired context-memory data comprise the lagging data. Thus, the data mover 470 generates a bit mask 600 to represent the lagging data by indicating bytes 0 through 9 contain invalid data and bytes 10 through 15 contain valid data in the bit mask. The generated bit mask 600 and the acquired context-memory data are then transferred to the output buffer 700.

The sequence then proceeds to Step 990 (FIG. 9B) where the data mover 470 determines if the amount of data specified by transmit instruction 830 has been transferred. If so, the sequence proceeds to Step 994; otherwise, the sequence proceeds to Step 992 where the next context-memory data is acquired prior to returning to Step 950. Since the transmit instruction 830 specifies 64 bytes and only 18 bytes have been transferred (i.e., 10 bytes of leading data, 2 bytes of insert data, and 6 bytes of lagging data), data mover 470 acquires the next 16 bytes of context-memory data and proceeds to Step 950.

At Step 950, the data mover 470 searches the command table, as described above, and locates a matching entry 500 (Step 955) that contains information specified by instruction 820. The sequence then proceeds to Step 965 where the data mover 470 examines the OP_CODE field 520 of the matching entry to determine if it specifies a delete operation. As noted above, the OP_CODE field 520 contains a value that indicates a delete operation so the sequence proceeds to Step 970 where the data mover 470 generates a bit mask 600, in a manner as described above, that represents the deleted data. The data mover 470 then transfers the bit mask 600 and acquired data to the output buffer. Specifically, the data mover 470 examines the contents of the matching entry's 500 C_ADDR field 540 and LEN field 560 and determines the bytes in the acquired context-memory data that are deleted. The data mover 470 then generates the bit mask 600, as described above, including marking the bits corresponding to the deleted bytes as invalid.

For example, assume the acquired context-memory data is associated with context-memory address locations 116 through 131 and that a matching entry 510 found in command table 500 contains information specified by instruction 820. The data mover 470 generates a bit mask 600 wherein bit BE2 620c and bit BE3 620d are marked to indicate the data represented by those bits are invalid. The data mover 470 marks the remaining bits (i.e., BE0 620a, BE1 620b, and BE4 620e through BE15 620p) to indicate the data represented by those bits are valid. The generated bit mask 600 and the acquired context-memory data are then transferred to the output buffer 700, where they are further processed.

Steps 950 through 992 are repeated until all the data specified in the context-memory transmit instruction have been transferred. The sequence then proceeds to Step 994, where the entries 510 in the command table are cleared, and then to Step 995 where the sequence ends.

Figure 10:
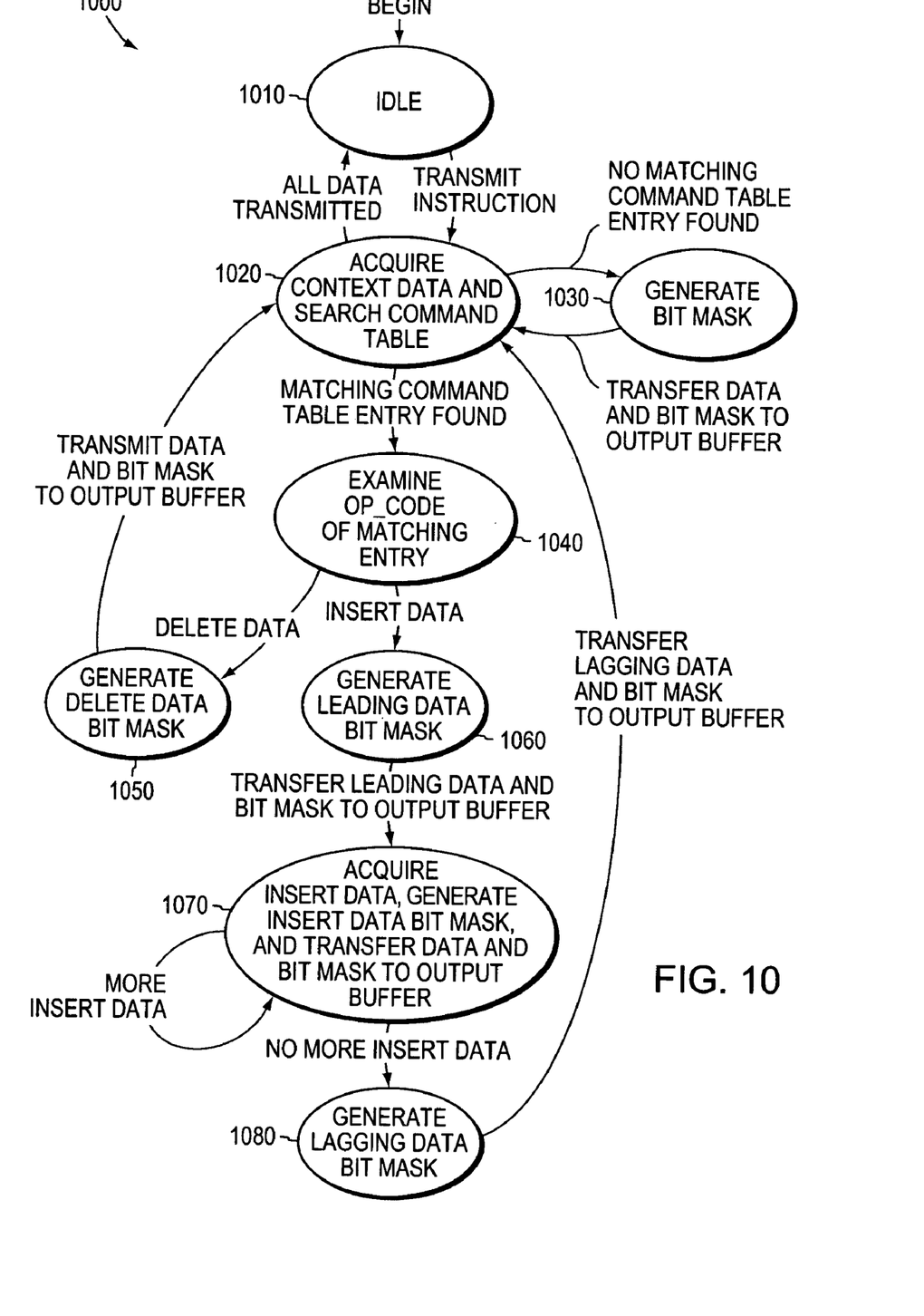
FIG. 10 is a state machine diagram that may be advantageously used to configure a state machine to operate in accordance with the present invention.

FIG. 10 is a state diagram 1000 that may be used to configure state machine 474 to operate in accordance with the inventive technique. The state machine 474 begins in an "idle" state 1010. Processor 450 executes a context-memory transmit instruction and directs the data mover 470 to transfer data from the context memory to the output buffer, as described above. The state machine 474 proceeds from the "idle" state 1010 to the "acquire context data and search command table" state 1020. At state 1020, the state machine 474 directs the data mover 470 to acquire context-memory data (e.g., 16 data bytes) from the context memory 430. The state machine 474 then searches the command table 500 and determines if the address of any of the acquired context-memory data falls within the range of addresses represented by the combination of the contents of the C_ADDR 540 and LEN 560 fields of a matching entry 510 in the command table 500. If not, the state machine 474 proceeds to the "generate bit mask" state 1030 where it generates a bit mask 600 for the acquired data, as described above. The state machine 474 then transfers the data and the generated bit mask to the output buffer, and returns to the "acquire context data and search command table" state 1020.

If the address of any of the acquired context-memory data falls within the range of addresses represented by the combination of the contents of the C_ADDR 540 and LEN 560 fields in the matching entry 510, the state machine 474 proceeds to the "examine the OP_CODE of matching entry" state 1040 where the data mover 470 examines the OP_CODE field 520 of the matching entry 510. If the OP_CODE field 520 contains a value that indicates a "delete data" operation, the state machine 474 proceeds to the "generate delete data bit mask" state 1050 where a bit mask 600 representing the deleted data is generated, as described above. The data and generated bit mask are then transferred to the output buffer 700 and the state machine 474 returns to the "acquire context data and search command table" state 1020.

If the OP_CODE field 520 contains a value that indicates an "insert data" operation, the state machine 474 proceeds to the "generate leading data bit mask" state 1060 where the leading data bit mask 600 is generated, as described above. The data and generated bit mask are then transferred to the output buffer 700 and the state machine 474 proceeds to the "acquire insert data, generate insert data enable bit mask, and transfer data and bit mask to output buffer" state 1070 where the insert data is acquired, insert bit masks 600 are generated, and the acquired insert data and associated bit masks 600 are transferred to the output buffer 700, as described above. The state machine 474 returns to this state 1070 until all the insert data (designated by the LEN field 560 value of the matching entry 510) has been transferred. The state machine 474 then proceeds to the "generate lagging data bit mask" state 1080 where the bit mask 600 for the "lagging data" is generated, as described above. The generated bit mask 600 and lagging data are then transferred to the output buffer 700 and the state machine 474 returns to the "acquire context data and search command table" state 1020. After all of the data specified by the transmit instruction has been transferred, the state machine returns to the "idle" state 1010.

Although the above-described embodiment of the invention describes the invention as implemented using various hardware devices, this is not intended to be a limitation of the invention. Rather, the invention may be implemented in whole or in part in software that is stored as a computer readable medium, such as a dynamic-random-access memory (DRAM) or a disk, containing computer executable instructions for execution in a processor. For example, the command table may be implemented as a software data structure such as a table, a linked list, an array, a variable, a register, or a register file. Moreover, placing commands in the command table, as well as functions performed by the data mover including the state machine, may be implemented as software routines or functions.

It should further be noted that although the above-described embodiment of the invention employs the inventive technique to modify data transferred from a context memory to an output buffer, in other embodiments of the invention, the inventive technique is used to transform (modify) data transferred from a source to a destination. For example, in one embodiment of the invention, the inventive technique is used to modify (e.g., insert data, delete data) data acquired from a source, such as a node on a network, and transferred to a destination, such as a storage device connected to the network. Moreover, it should be understood that the inventive technique may be used to transform (modify) data transferred from a source to a destination in ways other than by inserting or deleting data into and from the data transferred. For example, the inventive technique could be applied to encrypt data transferred from the source to the destination.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for modifying packet header data transferred to an output buffer, comprising:
   initiating, by a processor, a transfer of acquired packet header data to the output buffer;
   accessing a data structure including one or more entries containing information associated with a range of addresses and an operation code; and
   modify the acquired packet header data while the packet header data is being transferred to the output buffer by,
   searching the data structure for an entry containing information associated with a range of addresses that matches a range of addresses associated with the acquired packet header data,
   if a matching entry is found, determining if an operation code contained in a matching entry indicates an insert data operation, and if so,
   a) generating a leading bit mask that represents leading data contained in the acquired packet header data,
   b) transferring the leading bit mask and the acquired packet header data to the output buffer,
   c) acquiring insert data,
   d) generating an insert data bit mask that represents the insert data,
   e) transferring the insert data bit mask and the insert data to the output buffer,
   f) generating a lagging bit mask that represents lagging data contained in the acquired packet header data, and
   g) transferring the lagging bit mask and the acquired packet header data to the output buffer.

2. The method as defined in claim 1 further comprising:
   acquiring the packet header data from the context memory internal to the forwarding engine.

3. The method as defined in claim 1 further comprising:
   generating a bit mask associated with the acquired packet header data; and
   transferring the bit mask to the output buffer of the forwarding engine.

4. The method as defined in claim 1 further comprising modify the acquired packet header data while the packet header data is being transferred to the output buffer by:
   if a matching entry is found, determining if an operation code contained in the matching entry indicates a delete data operation; and
   if so, generating a delete bit mask that represents data that is deleted in the acquired packet header data and transferring the delete bit mask and the acquired packet header data to the output buffer of the forwarding engine.

5. The method as defined in claim 1 wherein each entry contains a length and a source address associated with the command.

6. The method as defined in claim 5 comprising:
   searching the data structure for an entry containing information associated with a range of addresses specified by the combination of the length and the source address contained in the entry that matches a range of addresses associated with the acquired packet header data.

7. The method as defined in claim 1 wherein the data structure is a table.

8. The method as defined in claim 1 comprising:
clearing the data structure.

9. A system comprising:
a context memory configured to hold packet header data;
a data structure including one or more entries containing information associated with a range of addresses and an operation code;
an output buffer; and
a data mover coupled to the context memory and the output buffer and configured to, upon initiation of a transfer of packet header data from the context memory to the output buffer, acquire the packet header data from the context memory, search the data structure for an entry containing information associated with a range of addresses that matches a range of addresses associated with the acquired packet header data and if a matching entry is found, determine if the operation code contained in the matching entry indicates an insert data operation and if so, (i) generate a leading bit mask that represents leading data contained in the acquired packet header data, (ii) transfer the leading bit mask and acquired packet header data to the output buffer, (iii) acquire insert data, (iv) generate an insert data bit mask that represents the insert data, (v) transfer the insert data bit mask and insert data to the output buffer, (vi) generate a lagging bit mask that represents lagging data contained in the acquired packet header data, and (vii) transfer the lagging bit mask and the acquired packet header data to the output buffer.

10. The system as defined in claim 9 wherein the data structure is a table.

11. The system as defined in claim 9 wherein the data mover is configured to determine if the operation code contained in the matching entry indicates a delete data operation and, if so, generate a delete bit mask that represents data that is deleted in the acquired packet header data.

12. The system as defined in claim 9 wherein each entry in the data structure contains a length and a source address associated with the command.

13. The system as defined in claim 12 wherein the data mover is configured to search the data structure for an entry containing information associated with a range of addresses specified by the combination of the length and the source address contained in the entry that matches a range of addresses associated with the acquired packet header data.

14. The system as defined in claim 9 wherein the data mover is configured to generate a bit mask associated with the packet header data and transfer the bit mask to the output buffer of the forwarding engine.

15. The system as defined in claim 14 wherein the output buffer of the forwarding engine comprises:
data steering logic configured to use the bit mask to identify valid data contained in the transferred packet header data;
a working register coupled to the data steering logic and configured to hold the valid packet header data transferred from the data steering logic; and
an output queue coupled to the working register and configured to hold the valid packet header data transferred from the working register.

16. An apparatus comprising:
means for acquiring packet header data;
means for accessing a data structure including one or more entries containing information associated with a range of addresses and an operation code;
means for searching the data structure for an entry containing information associated with a range of addresses that matches a range of addresses associated with the acquired packet header data;
means for determining if the operation code contained in a matching entry indicates an insert data operation; and
means for modify the acquired packet header data while the packet header data is being transferred to an output buffer by (i) generating a leading bit mask that represents leading data contained in the acquired packet header data, (ii) transferring the leading bit mask and the acquired packet header data to the output buffer, (iii) acquiring insert data, (iv) generating an insert data bit mask that represents the insert data, (v) transferring the insert data bit mask and the insert data to the output buffer, (vi) generating a lagging bit mask that represents lagging data contained in the acquired packet header data, and (vii) transferring the lagging bit mask and the acquired packet header data to the output buffer, if the operation code indicates an insert data operation.

17. The apparatus as defined in claim 16 wherein the means for acquiring is configured to acquire the packet header data from the context memory internal to the forwarding engine.

18. The apparatus as defined in claim 16 comprising:
means for generating a bit mask associated with the acquired packet header data; and
means for transferring the bit mask to the output buffer of the forwarding engine.

19. The apparatus as defined in claim 16 comprising:
means for determining if the operation code contained in a matching entry indicates a delete data operation; and
means for generating a delete bit mask that represents data that is deleted in the acquired packet header data and transferring the delete bit mask and the acquired packet header data to the output buffer, if the operation code in the matching entry indicates a delete data operation.

20. A computer readable medium comprising computer executable instructions for execution in a processor for:
initiating a transfer of the packet header data to an output buffer;
accessing a data structure including one or more entries containing information associated with a range of addresses and an operation code; and
modify the packet header data while the packet header data is being transferred to the output buffer by,
searching the data structure for an entry containing information associated with a range of addresses that matches a range of addresses associated with the acquired packet header data,
if a matching entry is found, determining if an operation code contained in a matching entry indicates an insert data operation, and if so,
a) generating a leading bit mask that represents leading data contained in the acquired packet header data,
b) transferring the leading bit mask and the acquired packet header data to the output buffer,
c) acquiring insert data,
d) generating an insert data bit mask that represents the insert data,
e) transferring the insert data bit mask and the insert data to the output buffer,
f) generating a lagging bit mask that represents lagging data contained in the acquired packet header data, and g) transferring the lagging bit mask and the acquired packet header data to the output buffer.

21. The computer readable medium as defined in claim 20 comprising computer executable instructions for execution in a processor for:
acquiring the packet header data from the context memory internal to the forwarding engine.

22. The computer readable medium as defined in claim 20 comprising computer executable instructions for execution in a processor for:
generating a bit mask associated with the acquired packet header data; and
transferring the bit mask to the output buffer of the forwarding engine.

23. The computer readable medium as defined in claim 20 comprising computer executable instructions for execution in a processor for:
if a matching entry is found, determining if an operation code contained in the matching entry indicates a delete data operation; and
if so, generating a delete bit mask that represents data that is deleted in the acquired packet header data and transferring the delete bit mask and the acquired packet header data to the output buffer of the forwarding engine.

24. A method comprising:
reading one or more instructions, by a processor of a forwarding engine, indicating an operation is to be performed on packet header data;
generating, in response to the one or more instructions, one or more commands associated with the operation;
placing the one or more commands in a data structure;
initiating a transfer of the packet header data from a context memory internal to the forwarding engine to an output buffer of the forwarding engine;
searching the data structure for an entry containing information associated with a range of addresses that matches a range of addresses associated with the packet header data;
determining from the entry that the operation is an insert data operation; and
performing the insert data operation, by a device operating independently from the processor, by determining a leading portion of the packet header data, transferring the leading portion of the packet header data to the output buffer, acquiring insert data, transferring the insert data to the output buffer of the forwarding engine, determining a lagging portion of the packet header data, and transferring the lagging portion of the packet header data to the output buffer of the forwarding engine.

25. The method as defined in claim 24 further comprising:
reading one or more additional instructions, by the processor of the forwarding engine, indicating another operation is to be performed on additional packet header data;
generating, in response to the one or more additional instructions, one or more additional commands associated with the another operation;
placing the one or more additional commands in the data structure;
initiating a transfer of the additional packet header data from the context memory internal to the forwarding engine to the output buffer of the forwarding engine;
searching the data structure for an entry containing information associated with a range of addresses that matches a range of addresses associated with the additional packet header data;
determining from the entry that the another operation is a delete data operation; and
performing the delete data operation, by the device operating independently from the processor, by determining a portion of the additional packet header data to be deleted and transferring the additional packet header data other than the portion of the additional packet header data to be deleted to the output buffer of the forwarding engine.

26. The method as defined in claim 24 wherein each entry contains a length and a source address.

27. The method as defined in claim 24 further comprising:
clearing the data structure.

28. A system comprising:
a context memory configured to hold packet header data;
a data structure including one or more entries;
an output buffer;
a processor configured to read one or more instructions indicating an operation is to be performed on the packet header data, generate, in response to the one or more instructions, one or more commands associated with the operation, place the one or more commands in the data structure, and initiate a transfer of the packet header data from the context memory to the output buffer; and
a data mover coupled to the context memory and the output buffer, and configured to operate independently from the processor, the data mover further configured to search the data structure for an entry containing information associated with a range of addresses that matches a range of addresses associated with the packet header data, determine from the entry that the operation is an insert data operation, and perform the insert data operation by determination of a leading portion of the packet header data, transfer of the leading portion of the packet header data to the output buffer, acquisition of insert data, transfer of the insert data to the output buffer, determination of a lagging portion of the packet header data, and transfer of the lagging portion of the packet header data to the output buffer.

29. The system as defined in claim 28, wherein
the processor is further configured to read one or more additional instructions that indicate another operation is to be performed on additional packet header data, generate, in response to the one or more additional instructions, one or more additional commands associated with the another operation, place the one or more additional commands in the data structure, and initiate a transfer of the additional packet header data from the context memory to the output buffer, and
the data mover is further configured to search the data structure for an entry containing information associated with a range of addresses that matches a range of addresses associated with the additional packet header data, determine from the entry that the another operation is a delete data operation, and perform the delete data operation by determination of a portion of the additional packet header data to be deleted and transfer of the additional packet header data other than the portion of the additional packet header data to be deleted to the output buffer.

* * * * *